(12) United States Patent
Attey

(10) Patent No.: US 9,303,622 B2
(45) Date of Patent: Apr. 5, 2016

(54) WIND TURBINE APPARATUS

(75) Inventor: Graeme Scott Attey, South Fremantle (AU)

(73) Assignee: Design Licensing International Pty Ltd, Western Australia (AU)

( * ) Notice: Subject to any disclaimer, the term of this patent is extended or adjusted under 35 U.S.C. 154(b) by 214 days.

(21) Appl. No.: 12/478,597

(22) Filed: Jun. 4, 2009

(65) Prior Publication Data

US 2009/0304512 A1 Dec. 10, 2009

Related U.S. Application Data

(63) Continuation of application No. PCT/AU2007/001865, filed on Dec. 4, 2007.

(30) Foreign Application Priority Data

Dec. 4, 2006 (AU) .............................. 2006906751
Aug. 21, 2007 (AU) .............................. 2007904481

(51) Int. Cl.
*F03D 3/04* (2006.01)
*F03D 3/00* (2006.01)

(52) U.S. Cl.
CPC .............. *F03D 3/002* (2013.01); *F03D 3/0409* (2013.01); *F05B 2240/301* (2013.01); *F05B 2240/9111* (2013.01); *F05B 2240/9112* (2013.01); *Y02B 10/30* (2013.01); *Y02E 10/728* (2013.01); *Y02E 10/74* (2013.01)

(58) Field of Classification Search
CPC ...... F03D 3/002; F03D 3/0427; F03D 3/0409
USPC .............. 416/197 A, 227 A, 227 R, 228, 235, 416/236 R, 243; 290/44, 55
See application file for complete search history.

(56) References Cited

U.S. PATENT DOCUMENTS

| 705,922 A | * | 7/1902 | Gran | 415/151 |
| 1,574,171 A | * | 2/1926 | Ryan | 415/4.4 |
| 1,835,018 A | * | 12/1931 | Darrieus | 415/224 |
| 3,033,441 A | * | 5/1962 | Coester | 415/53.1 |

(Continued)

FOREIGN PATENT DOCUMENTS

| DE | 10328249 A1 | 2/2005 | | |
| DK | WO 2010124692 A1 | * | 11/2010 | ................ F03D 1/04 |

(Continued)

OTHER PUBLICATIONS

PCT International Patent Application No. PCT/AU2007/001865 filed Dec. 4, 2007 in the name of Attey, International Search Report mailed May 8, 2008.

(Continued)

*Primary Examiner* — Sean J Younger
(74) *Attorney, Agent, or Firm* — Levine Bagade Han LLP

(57) ABSTRACT

There is provided a wind turbine apparatus which comprises blades having an aerofoil profile. The apparatus is arranged to start up even in light wind conditions and to act as a lift type device at higher rotational speeds. The apparatus may comprise wind deflectors to concentrate wind through the apparatus. Further, the blades may be orientated at less than 90° to a radius line which leads to improved performance. Still further, the apparatus may be arranged to heat water by means of solar energy.

21 Claims, 7 Drawing Sheets

(56) References Cited

U.S. PATENT DOCUMENTS

| | | | |
|---|---|---|---|
| 3,070,287 A * | 12/1962 | Eck | 416/183 |
| 4,162,410 A | 7/1979 | Amick | |
| 4,245,958 A | 1/1981 | Ewers | |
| 4,247,251 A | 1/1981 | Wuenscher | |
| 4,315,713 A * | 2/1982 | Verplanke | 415/125 |
| 4,321,476 A * | 3/1982 | Buels | F03D 1/02 290/55 |
| 4,379,972 A | 4/1983 | Sosa et al. | |
| 4,430,044 A | 2/1984 | Liljegren | |
| 4,452,568 A * | 6/1984 | Andersson | 416/119 |
| 4,486,143 A * | 12/1984 | McVey | 415/164 |
| 4,555,218 A * | 11/1985 | Jonsson et al. | 416/17 |
| 4,857,753 A | 8/1989 | Mewburn-Crook et al. | |
| 5,076,759 A | 12/1991 | Schonell | |
| 5,380,149 A | 1/1995 | Valsamidis | |
| 5,451,138 A * | 9/1995 | Istorik et al. | 415/53.1 |
| 5,527,151 A | 6/1996 | Coleman et al. | |
| 5,577,882 A * | 11/1996 | Istorik et al. | 415/53.1 |
| 5,642,984 A | 7/1997 | Gorlov | |
| 6,097,104 A | 8/2000 | Russell | |
| 6,155,892 A | 12/2000 | Gorlov | |
| 6,172,429 B1 | 1/2001 | Russell | |
| 6,201,313 B1 | 3/2001 | Nakamats | |
| 6,293,835 B2 | 9/2001 | Gorlov | |
| 6,309,172 B1 * | 10/2001 | Gual | 415/4.4 |
| 6,481,957 B1 * | 11/2002 | Brill | 415/4.1 |
| 6,638,005 B2 | 10/2003 | Holter et al. | |
| 6,740,989 B2 | 5/2004 | Rowe | |
| 6,784,566 B2 | 8/2004 | Thomas | |
| 6,814,070 B2 * | 11/2004 | Bourne et al. | 126/623 |
| 6,877,948 B2 * | 4/2005 | Cutcher | 415/4.4 |
| 6,966,747 B2 * | 11/2005 | Taylor et al. | 415/1 |
| 7,008,171 B1 | 3/2006 | Whitworth | |
| 7,109,599 B2 * | 9/2006 | Watkins | 290/55 |
| 8,419,346 B2 | 4/2013 | Attey | |
| 2003/0025335 A1 | 2/2003 | Elder | |
| 2003/0209911 A1 | 11/2003 | Pechler | |
| 2003/0231951 A1 | 12/2003 | Kaare | |
| 2004/0105754 A1 * | 6/2004 | Takahashi | 415/4.4 |
| 2005/0099013 A1 * | 5/2005 | Noguchi | 290/55 |
| 2007/0224029 A1 * | 9/2007 | Yokoi | 415/4.2 |

FOREIGN PATENT DOCUMENTS

| | | | |
|---|---|---|---|
| EP | 0046370 A1 | 2/1982 | |
| FR | 2886353 A1 | 12/2006 | |
| GB | 561435 A | 5/1944 | |
| GB | 2000556 A | 1/1979 | |
| GB | 2049066 A | 12/1980 | |
| GB | 2404700 A1 | 2/2005 | |
| GB | 2431696 A * | 5/2007 | |
| GB | WO 2008001080 A1 * | 1/2008 | F03B 17/061 |
| JP | 55-142978 A | 11/1980 | |
| JP | 2001193631 A2 | 7/2001 | |
| JP | 2002021705 A2 | 1/2002 | |
| JP | 2003065206 A2 | 3/2003 | |
| JP | 2004019537 A2 | 1/2004 | |
| JP | 2005036649 A | 2/2005 | |
| JP | 2005220893 | 3/2007 | |
| KR | 20050093540 A | 9/2005 | |
| NL | 1019855 C2 | 12/2002 | |
| RU | 2096259 C1 | 11/1997 | |
| SU | 1733681 A1 | 5/1992 | |
| WO | WO 94/03725 | 2/1994 | |
| WO | WO 2005/028861 | 3/2005 | |
| WO | WO 2007/027113 | 8/2005 | |
| WO | WO 2005/116446 | 12/2005 | |
| WO | WO 2006095369 A1 * | 9/2006 | |
| WO | WO 2008/067593 | 6/2008 | |
| WO | WO 2009/135261 | 11/2009 | |

OTHER PUBLICATIONS

PCT International Patent Application No. PCT/AU2009/000567 filed May 7, 2009 in the name of Attey, International Search Report mailed Aug. 24, 2009.

European Patent Application No. 07815663.5 filed Dec. 4, 2007 in the name of Design Licensing International Pty Ltd, Supplemental European Search Report mailed Sep. 22, 2010.

\* cited by examiner

WIND TURBINE APPARATUS

CROSS-REFERENCE TO RELATED APPLICATIONS

This application is a continuation of PCT International Application Number PCT/AU2007/001865 filed on Dec. 4, 2007, which claims benefit of priority to Australian Patent Application Nos. 2006906751 filed Dec. 4, 2006 and 2007904481 filed Aug. 21, 2007; the content of each of which is incorporated herein by reference in its entirety.

BACKGROUND OF THE INVENTION

Existing wind turbine apparatuses have a number of problems including fluctuating strength and variable angles of attack of winds found in urban environments. Further, there are problems with noise, vibration and reliability issues in relation to existing wind turbine apparatuses. Still further, a substantial cost is incurred in mounting the wind turbine apparatus at elevated points to reach consistent wind conditions. The present invention provides a wind turbine apparatus in which at least some of the abovementioned problems are alleviated.

SUMMARY OF THE PRESENT INVENTION

In accordance with one aspect of the present invention, there is provided a wind turbine apparatus characterized by a plurality of elongated turbine blades rotatably mounted about an elongated axis, each turbine blade having an aerofoil shaped profile with a continuously curved outer foil surface and a cupped or cut-away portion on an inner foil surface.

In accordance with a further aspect of the present invention there is provided a wind turbine apparatus characterized by a plurality of elongated turbine blades rotatably mounted about an elongated axis, each turbine blade having an aerofoil shaped profile with a continuously curved outer foil surface, wherein the turbine blades are disposed at an angle of less than 90° to a radius line extending from the axis. In accordance with a yet further embodiment of the present invention there is provided a wind turbine apparatus characterized by a plurality of elongated turbine blades rotatably mounted about an elongated axis, each turbine blade having an aerofoil shaped profile with a continuously curved outer foil surface, wherein wind deflection members are located adjacent the apparatus so as to direct wind air into the apparatus, hi accordance with a still yet further embodiment of the present invention there is provided a wind turbine apparatus characterized by a plurality of elongated turbine blades rotatably mounted about an elongated axis, each turbine blade having an aerofoil shaped profile with a continuously curved outer foil surface, wherein the apparatus is also arranged to heat water by means of solar energy.

BRIEF DESCRIPTION OF THE DRAWINGS

The present invention will now be described, by way of example, with reference to the accompanying drawings, in which.

DETAILED DESCRIPTION OF THE INVENTION

Figure 1:
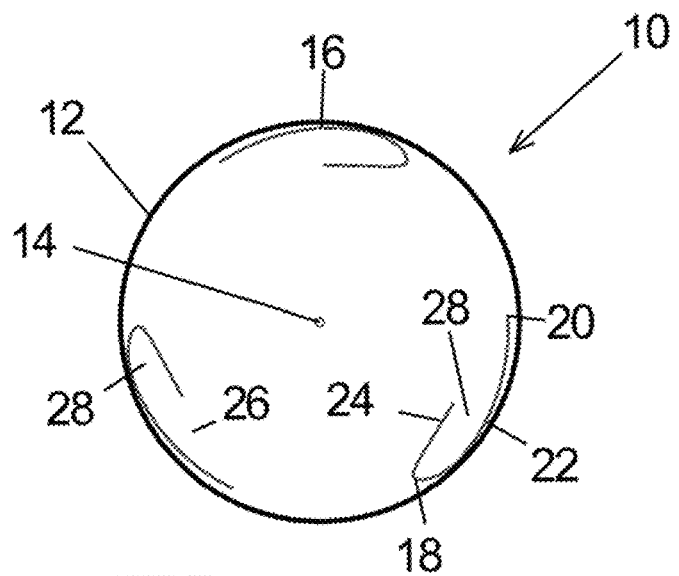
FIG. 1 is a schematic end elevation of a wind turbine apparatus in accordance with one embodiment of the present invention.

In the following description of the embodiments shown in the accompanying drawings like reference numerals denote like parts.

Figure 2:
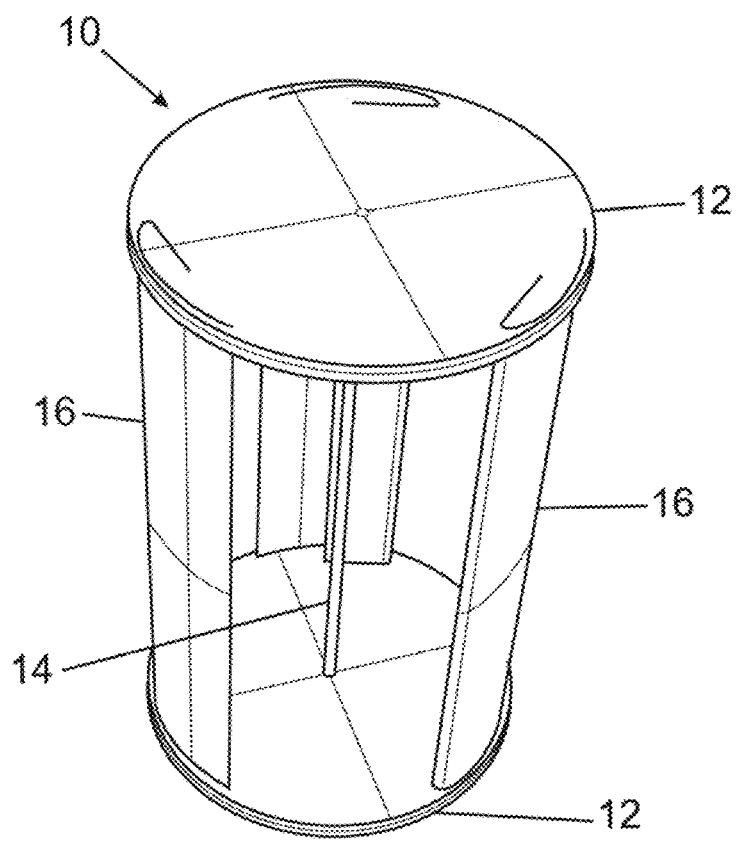
FIG. 2 shows a perspective view of the apparatus of FIG. 1.

In FIGS. 1 and 2 of the accompanying drawings, there is shown a wind turbine apparatus 10 comprising a pair of end plate discs 12 (only one of which can be seen in FIG. 1). The end plate discs 12 are mounted on a central axis 14 and are arranged for rotation about the central axis 14.

The apparatus 10 further comprises a plurality, in this case three, of asymmetrical aero foil turbine blades 16. The blades 16 are equispaced about the periphery of the discs 12 and are located between the discs 12.

Figure 3:
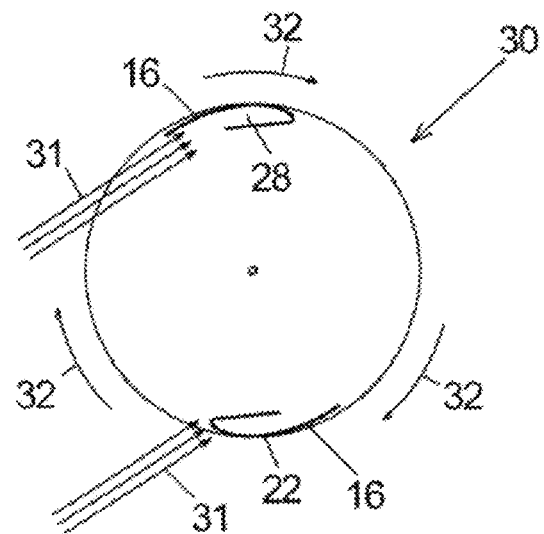
FIG. 3 is a view similar to FIG. 1 showing a further embodiment of a wind turbine apparatus and illustrating how wind impacts on the apparatus.

Each blade 16 comprises a leading edge 18, a trailing edge 20, an outer low pressure lift producing curved surface 22 and an inner relatively high (ambient) pressure surface 24. The surface 24 extends rearwardly from the leading edge 18 for a portion of the distance to the trailing edge 20, in this case about 50% of that distance. Thus, there is a gap 26 between a trailing end of each surface 24 and the corresponding trailing edge 20. Further, each blade 16 is cupped by virtue of a hollow 28 between an inner face of the surface 22 thereof and an adjacent face of the corresponding surface 24. Alternatively, the blades 16 may be provided with cut away portions adjacent the trailing edges 20. In FIG. 3 of the accompanying drawings, there is shown a view similar to FIG. 1 except that there is shown a twin blade apparatus 30. In FIG. 3, there is shown a plurality of arrows 31 which indicate wind direction. A turbine spinning direction is indicated by arrows 32. As shown, ambient wind indicated by the arrows 31 pushes into a hollow 28 of a cupped blade 16 facing down wind. This action facilitates start up movement of the turbine apparatus 30.

Once rotational movement has commenced there is also a lift effect caused by wind flowing over the surface 22 of the lower blade 16 (as shown in FIG. 3 of the accompanying drawings) which induces lift because of the foil shape of the blade 16.

In relation to the embodiments of the present invention shown in FIGS. 1 to 3 of the accompanying drawings it is noted that the turbine blades 16 are conveniently held between the two outer end discs 12 as described hereinabove. However, they can also be curved back into the central axis 14 without end plates. Preferably, the number of blades used in a wind turbine apparatus 10 of the present invention is two or three but more can be utilised if desired.

The provision of the cupped configuration of each blade 16 provides the wind turbine apparatus 10 with a dual drag and lift operational effect. In this configuration, the curved outer surface 22 preferably largely follows an outer curve of the end plate discs 12.

Further, the inner high pressure surface 24 can extend rearwardly from the leading edge 18 for a distance from 10-90% of the distance between the leading edge 18 and the trailing edge 20. However, this distance is preferably about 50-60% of the distance from the leading edge 18 to the trailing edge 20 as this has been found to offer a preferred compromise between early start up performance and Tip Speed Ratio (TSR) performance.

This configuration provides sufficient inside surface for the wind path to be induced to flow smoothly back across the inside of each blade 16 with only a minimal performance change from a full foil.

However, when looking from behind, the foil cupped shape enables the wind air to be caught even in very light winds so that the wind turbine apparatus 10 can be readily started even in light wind conditions. Once the wind turbine apparatus 10 gains sufficient rotational speed and/or the wind gains sufficient strength, it begins to act as a lift type device and the apparatus 10 is therefore able to spin faster than wind speed. It has been found that the TSR exceeds 1 and may typically operate in the 1.5-3 range.

Figure 4A:
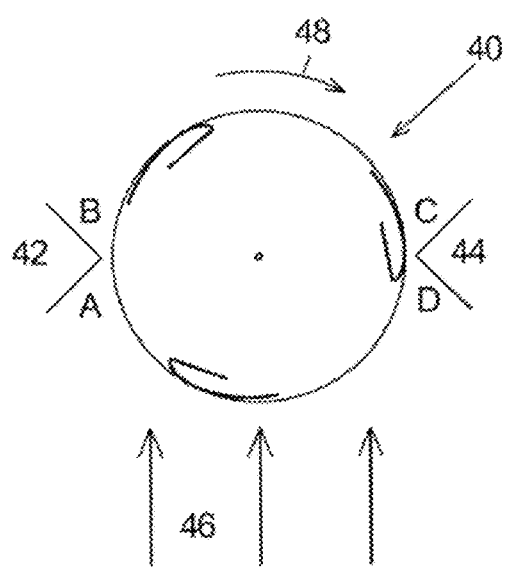
FIGS. 4a and 4b are views similar to FIG. 1 showing the presence of variations of deflection members adjacent to the wind turbine apparatus.
Figure 4B:
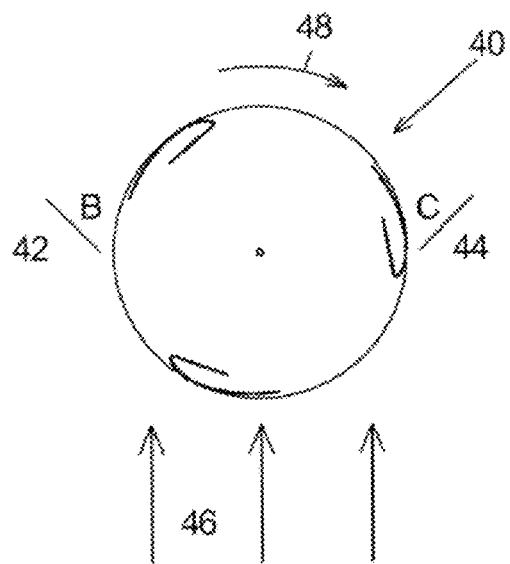

In FIGS. 4a and 4b of the accompanying drawings there is shown a turbine blade apparatus 40 similar to that shown in FIG. 1. These embodiments also comprise a pair of opposed wind deflection members 42 and 44. In FIG. 4a the deflection member 42 has a first plate A and a second plate B. The deflection member 44 has a first plate D and a second plate C. Wind direction is shown by arrows 46 whilst the turbine apparatus 40 spinning direction is shown by an arrow 48.

Figure 5:
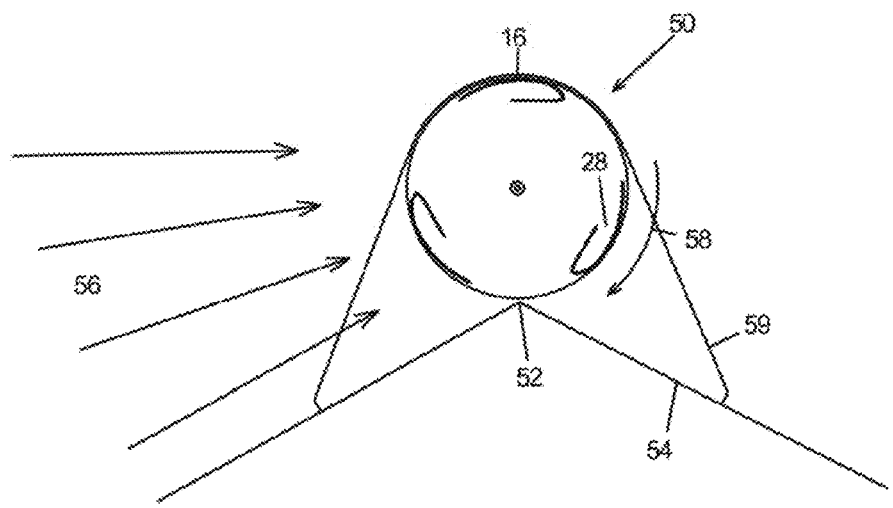
FIG. 5 is a view similar to FIG. 1 showing a turbine blade apparatus of the present invention mounted on a ridge line of a roof.

In FIG. 5 of the accompanying drawings, there is shown a turbine blade apparatus 50, mounted on a ridge line 52 of a roof 54. Wind direction is shown by arrows 56 and the turbine apparatus 50 spinning direction is shown by an arrow 58. The turbine blade apparatus is mounted by means of a support frame 59.

Addition of the deflection members 42 and 44 about the periphery of the wind turbine apparatus can increase turbine performance.

In relation to the embodiment of FIG. 4a it is found that the plates A and D clearly provide an extra degree of wind concentration through the turbine apparatus 40. Thus, the presence of these plates leads to an increase in performance. However, it has been found that the largest individual improvement from a single plate comes from the plate B which does not compress wind into the turbine. Similarly plate C does not compress wind but also provides significant improvements. Thus, it follows that the deflection members 42 and 44 alter the wind flow patterns through the turbine to advantageous performance effect. Preferably, the apex edges of the deflector members 42 and 44 are disposed at a distance of less than 20% of the diameter of the wind turbine from the wind turbine to produce significant improvements in performance.

When all four plates A, B, C and D are used, a maximum effect is achieved. However, improvements can be obtained by using only some of the plates A, B, C and D, as shown in FIG. 4b.

In relation to the embodiment of FIG. 5 the roof 54 provides one element of a wind deflector. This provides some of the benefits of the embodiments shown in FIGS. 4a and 4b.

Further, it has been found that best results are obtained when the deflector members 42 and 44 or the ridge line 52 have a clear V-shaped apex rather than a rounded apex.

Further, it has been found that these techniques can be applied to commercial buildings and office blocks which do not have a rooftop ridge line. It has been found that in this case the wind turbine apparatus can be mounted at building edges such as 90° building corners. It has been found that such corners provide an opportunity for mounting of the apparatus of the present invention as the building corners provide an area of wind concentration and offer natural deflector plate type geometry.

Further, roof top ridge lines and building corners structurally are the most strong positions at which to mount wind turbine apparatuses according to the present invention.

Figure 6:
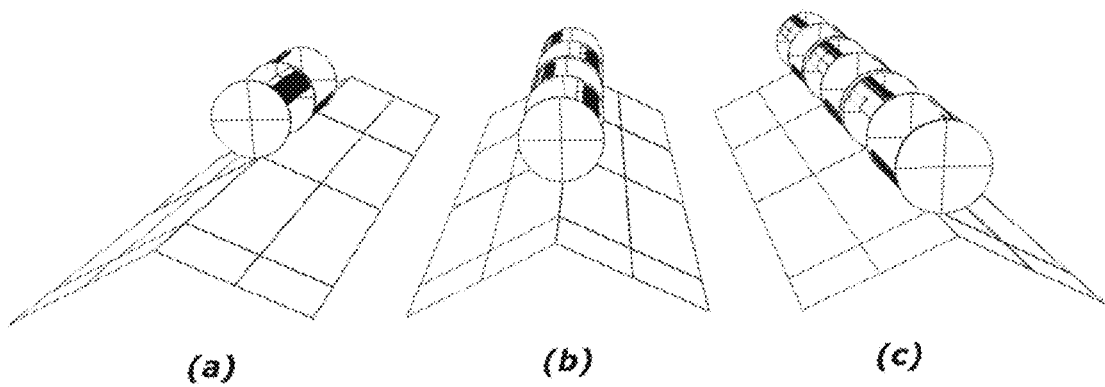
FIG. 6 shows three examples of the wind turbine apparatus of the present invention mounted on a ridge line of a roof in single, double or triple turbine modules.

In FIG. 6 there are shown three examples of wind turbine apparatuses mounted on roof ridge lines. At (a) there is shown a single module, at (b) there is shown a double module and at (c) there is shown a triple module.

Figure 7:
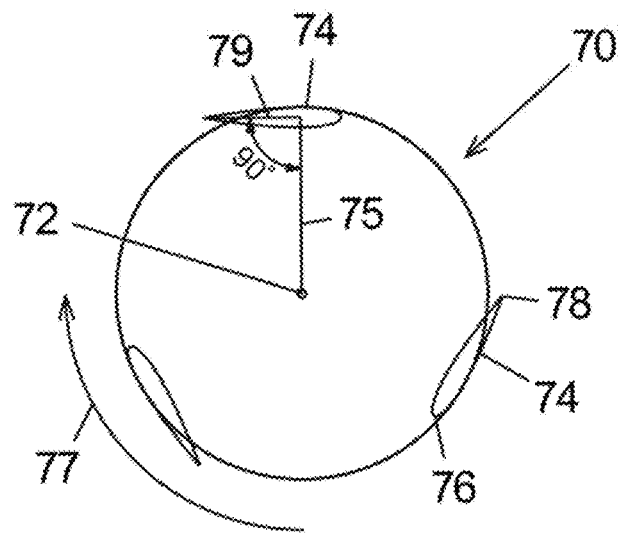
FIG. 7 is a schematic end elevation of a conventional vertical axis wind turbine.

In FIG. 7 of the accompanying drawings, there is shown an end view of a conventional wind turbine apparatus 70. In FIG. 7, there is shown a wind turbine apparatus 70 having a central rotational axis 72 and a plurality of peripheral solid turbine foil blades 74. The blades 74 are symmetrical when viewed in end elevation as seen in FIG. 7.

The blades 74 have a leading end 76 and a trailing edge 78. The turbine spinning direction is shown by an arrow 77. The blades 74 are disposed at an angle of 90° relative to a radius 75 extending from the axis 72 and intersecting with a line 79 extending from the trailing edge 78 to a mid point where the blade 74 is thickest.

Figure 8:
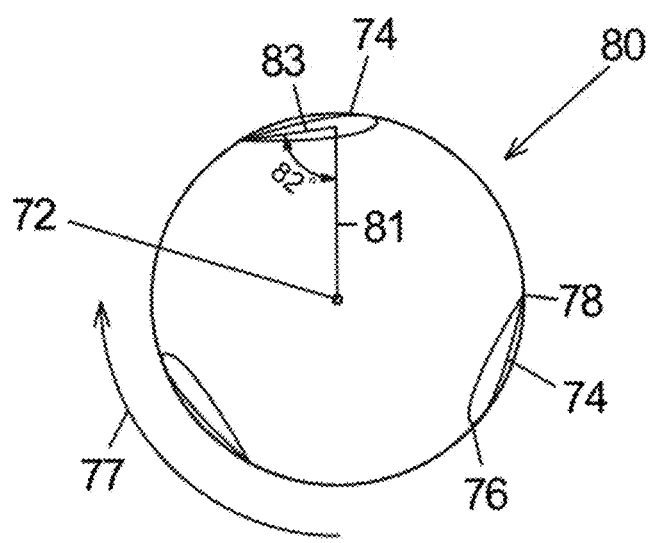
FIG. 8 is a schematic end elevation of a wind turbine apparatus in accordance with the present invention showing blades which are orientated at an angle less than 90° to a radius line.
Figure 9:
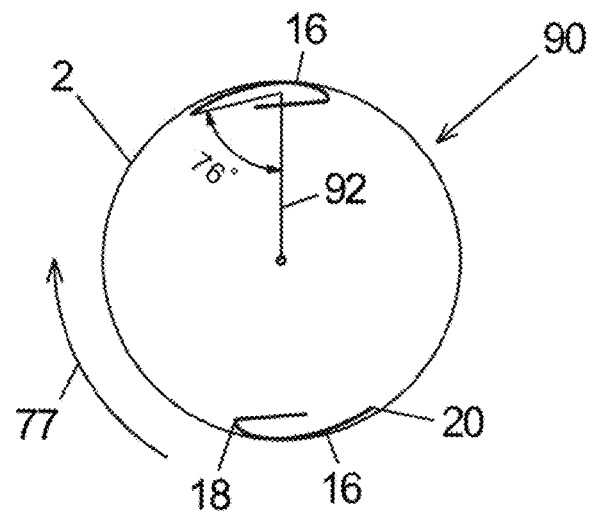
FIG. 9 is a schematic end elevation similar to FIG. 8 showing turbine blades similar to those in FIG. 1.

As can be seen each trailing edge 78 extends outwardly beyond the confines of the discs 12. It has been found that this 90° angle is detrimental to efficiency of the apparatus 70. In FIG. 8, there is shown a wind turbine apparatus 80 in accordance with the present invention in which solid turbine foil blades 74 are disposed at an angle of less than 90° to a radius 81 extending from the axis 72 intersecting with a line 83 extending from the trailing edge 78 to a mid point where the blade 74 is thickest. It has been discovered that this angle leads to a substantial improvement in efficiency of the turbine apparatus 80. In FIG. 9 of the accompanying drawings, there is shown a turbine blade turbine apparatus 90 of the present invention which is similar to that shown in FIG. 8. However, the apparatus 90 comprises a pair of cupped turbine blades 16 similar to those shown in FIG. 1. In this case a line from the trailing edge 20 of each blade 16 to the mid point of the thickest part of the blade 16 intersects a radius line 92 at an angle of about 76°.

As indicated herein above it has been found that improved performance can be obtained by orientation of the blades of FIGS. 8 and 9 at an angle of less than 90°. This angle is determined by intersection of a line drawn from the axis of rotation to the center of the thickest point of the blade and a line drawn from the center of the thickest point of the blade to the trailing edge. It is found that orienting the blades at an angle of less than 90° improves the lift to drag ratio and therefore provides an improved performance over traditional blades which are disposed at 90°.

Figure 10:
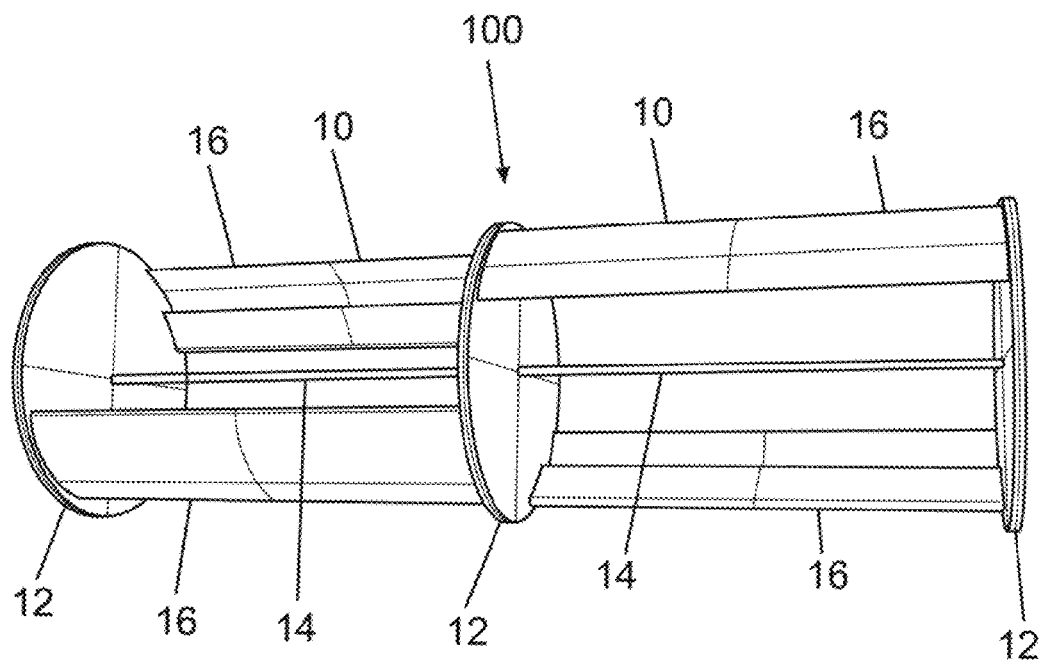
FIG. 10 is a perspective view of a double section wind turbine module apparatus of the present invention.

In FIG. 10 of the accompanying drawings, there is shown a single module wind turbine apparatus 100 of the present invention. In this embodiment two wind turbine sections 10 are placed together to form one complete module. As shown these turbine sections 10 comprise the plate discs 12 and the turbine blades 16 together with the axis 14. However, as shown the two blades 16 of one section are rotated at 90° from the two turbine blades 16 of the other section. This arrangement provides a smoother torque curve and generally smoother and better balanced performance than single sections of two blades only.

Figure 11:
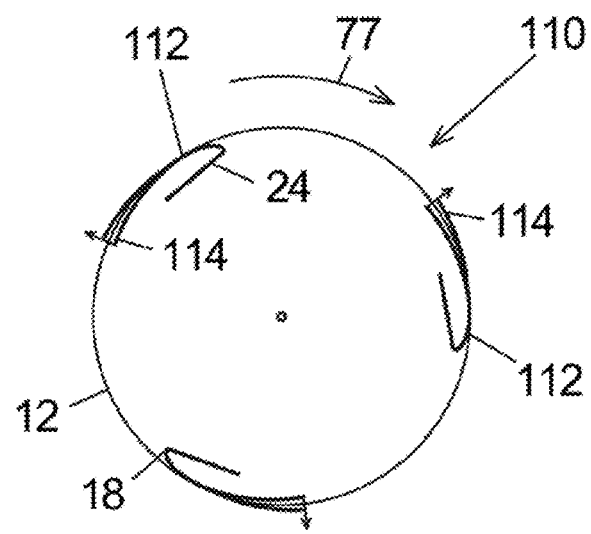
FIG. 11 is a schematic end elevation of a wind turbine apparatus in accordance with the present invention showing flexible turbine blades.

In FIG. 11 of the accompanying drawings there is shown an apparatus 110 similar to that shown in FIG. 1. However, in this case the apparatus 110 comprises turbine foil blades 112 which have flexible trailing edges 114. In this embodiment it is found that the trailing edges 114 tend to flex outwardly at increased rotational speeds. Thus, as shown, each trailing edge 114 is arranged to move from its relaxed stationary position outwardly as the spin rate increases. In this way, if rotational speeds become excessive the trailing edges 114 flex outwardly and apply a lower lift and higher drag effect to inhibit increased rotational speeds of the apparatus 110. The blades 112 could be made flexible other than at the trailing edge to achieve a similar result to that achieved by the use of the flexible trailing edges 114.

This effectively increases the blade angle which in turn reduces performance thereby reducing the TSR in relation to increasing wind speeds. This is a simple way of reducing high wind speed spin rates and reducing the chance of runaway and also reducing noise, vibration and turbine damage.

It is envisaged that the wind turbine apparatus of the present invention would be made in a modular style so that a number of units could be connected together in a modular arrangement on a building. Further, it is envisaged that the individual turbines would be relatively easy to manufacture cheaply by low cost mass production techniques such as injection moulding and extrusion. Further, the units could be made from plastics materials. Further, although the embodiments described herein utilise units with a horizontal axis of rotation it is envisaged that units with vertical axis of rotation or any angle in between horizontal and vertical could be utilised.

Further, the wind turbine apparatus of the present invention is particularly envisaged for use in generation of electricity. In that connection it is envisaged that the units of the present invention could utilise regularly available electrical connectors and that the plurality of units in a modular system could be connected together in known manner similar to that employed for photo voltaic solar panels.

As the apparatus of the present invention is designed for mounting onto buildings at external locations of wind concentration, in most instances these locations are also usually sunny. It therefore stands to reason that there could be significant cost savings if the apparatus also incorporated the ability to heat water.

As it currently stands, wind turbines and solar hot water systems are completely separate items. Both are stand alone and require their own separate mounting frames. These mounting frames in combination with the installation cost of conventional solar hot water systems can typically represent one third of the overall system cost. No synergy currently exists between wind turbines and solar hot water in the form of conventional known technology.

Incorporated into the apparatus of the present invention is the ability to also heat water by solar means without affecting the electrical generation performance of the turbine. This has the advantage of being able to create hot water for a small cost addition, above the base cost of the turbines themselves. Instead of a consumer having to pay the traditional large cost of a conventional solar hot water system, they can now obtain hot water for smaller cost by incorporating it into their purchase of apparatus of the present invention. This way the consumer can save on their solar hot water system costs in addition to now being able to generate electricity.

There are a variety of ways of incorporating solar hot water into the apparatus of the present invention.

Figure 12:
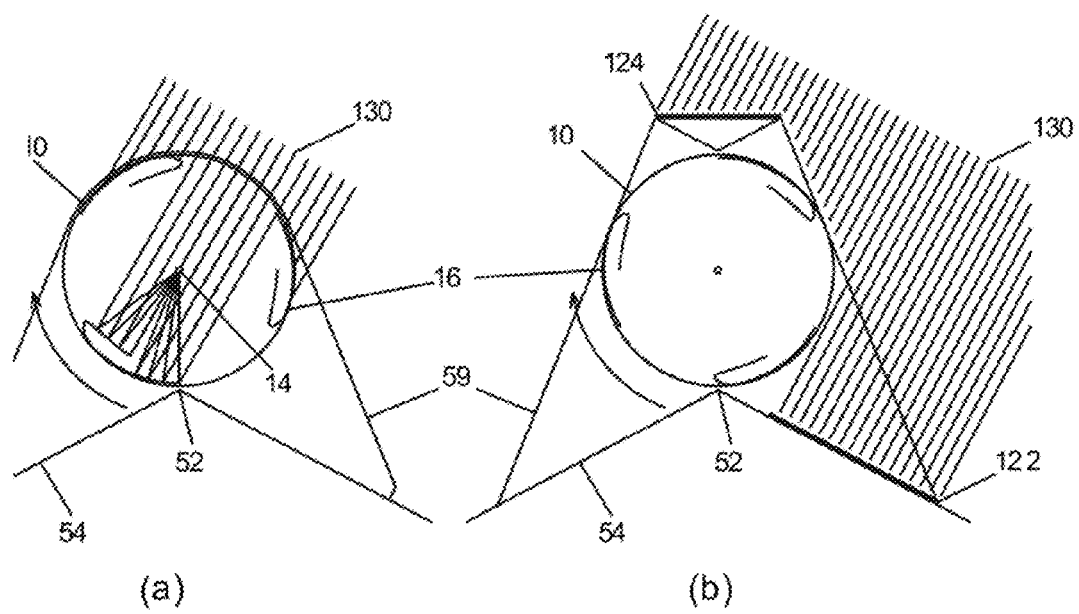
FIG. 12 is a schematic side elevation showing the wind turbine apparatus of the present invention in conjunction with heating of water by solar energy.

One example shown in FIG. 12(a) is by running water through an axis 14 in the form of a tube and incorporating parabolic micro-strip reflection into the insides of blades. The sun's rays 130 can be refracted off the inside of the blades and concentrated onto the axis tube to heat the water. Although some sunlight is blocked by the blades as they spin, this method has the advantage of suiting a wider range of sun angles.

Another example is by running water through the mounting frame base 59 and heating via conventional solar thermal means as shown in FIG. 12(b) at 122.

Another example is by running water through the mounting frame top and heating via conventional solar thermal means as shown in FIG. 12(b) at 124.

Figure 13:
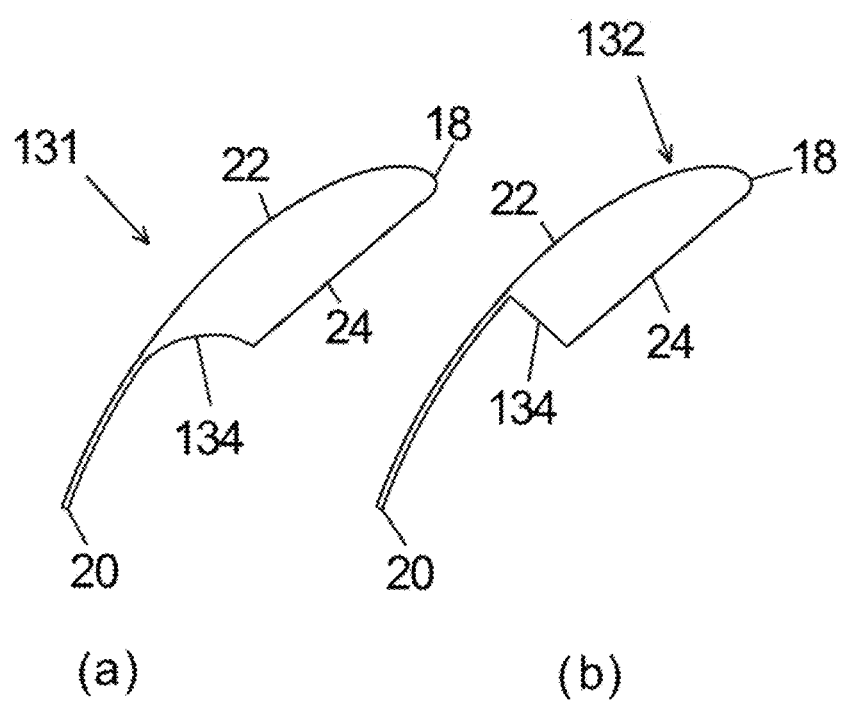
FIG. 13 shows examples of turbine blades useful to the present invention which have cut away profiles.

In FIGS. 13(a) and 13(b) there are shown examples of turbine blades 131 and 132 which have cut away profiles. These blades may be used in place of the blades 16 shown in FIGS. 1 and 2. As can be seen these blade embodiments do not have a hollow 28 but they still have the surface 24 which extends partially from the leading edge 18 towards the trailing edge 20.

Thus, in each case there is a rearwardly facing surface 134 arranged to catch wind at start up in similar manner to the hollow 28.

Modifications and variations as would be apparent to a skilled addressee are deemed to be within the scope of the present invention.

I claim:

1. A wind turbine apparatus, comprising:
   a turbine blade assembly comprising a plurality of elongated turbine blades rotatably mounted about an axis, each turbine blade having a lift-producing aerofoil-shaped profile with a leading edge, a trailing edge, an outer low-pressure curved surface and an inner relatively high-pressure surface; and
   a pair of wind deflection members,
   wherein each wind deflection member comprises a flat elongated plate extending parallel to said axis and including an apex edge,
   wherein the apex edges are positioned at opposite ends of a diameter of the turbine blade assembly,
   wherein a first perpendicular direction extends from the diameter defined by the position of the apex edges, and
   wherein when the wind direction is in the first perpendicular direction, the turbine blades and the deflection members are exposed to an open, unobstructed wind flow, and no wind-guiding members compress the wind into the turbine blades; and wherein the plates terminate in the first perpendicular direction before the termination of the turbine blade assembly in the first perpendicular direction.

2. The wind turbine apparatus of claim 1, wherein each turbine blade has a leading edge, a trailing edge and a thickest portion therebetween, wherein a first line segment drawn from the axis to the center of a thickest portion of a first turbine blade and a second line segment drawn from the center of the thickest portion of the first turbine blade to the trailing edge of the turbine blade define an angle of less than 90°.

3. The wind turbine apparatus of claim 1, wherein the deflection members are disposed at a distance of less than 20% of the diameter of the turbine blade assembly.

4. The wind turbine apparatus of claim 2, wherein the deflection members are disposed at a distance of less than 20% of the diameter of the turbine blade assembly.

5. The wind turbine apparatus of claim 1, comprising only two deflection members, wherein one deflection member is on each side of the turbine blade assembly.

6. The wind turbine apparatus of claim 5, wherein the wind turbine apparatus is mounted such that said diameter of the turbine blade assembly is substantially perpendicular to an expected wind direction.

7. The wind turbine apparatus of claim 2, comprising only two deflection members, wherein one deflection member is on each side of the turbine blade assembly.

8. The wind turbine apparatus of claim 1, wherein the wind turbine apparatus comprises at least two spaced end plates with the axis extending there between, and where the turbine blades extend between the end plates.

9. The wind turbine apparatus of claim 8, comprising at least two sections located adjacent each other along the axis, each section having a plurality of blades, the blades of adjacent sections being rotated relative to each other about the axis.

10. The wind turbine apparatus of claim 2, comprising at least two spaced end plates with the axis extending there between; and where the turbine blades extend between the end plates.

11. The wind turbine apparatus of claim 10, comprising at least two sections located adjacent each other along the axis, each section having a plurality of blades, the blades of adjacent sections being rotated relative to each other about the axis.

12. The wind turbine apparatus of claim 5, comprising at least two spaced end plates with the axis extending there between, and where the turbine blades extend between the end plates.

13. The wind turbine apparatus of claim 12, comprising at least two sections located adjacent each other along the axis, each section having a plurality of blades, the blades of adjacent sections being rotated relative to each other about the axis.

14. The wind turbine apparatus of claim 1, wherein the turbine blades are formed by extrusion.

15. The wind turbine apparatus of claim 1, wherein the turbine blades have a solidity greater than 27%.

16. The wind turbine apparatus of claim 15, wherein the turbine blades have a solidity equal to about 33%.

17. The wind turbine apparatus of claim 8, wherein the turbine blades have a solidity greater than 27%.

18. The wind turbine apparatus of claim 1, wherein the wind turbine apparatus is supported by a mounting frame, and wherein the mounting frame comprises a solar heat collector for the heating of water.

19. The wind turbine apparatus of claim 1, wherein at least one of the apex edges comprises a v-shaped apex.

20. The wind turbine apparatus of claim 1, wherein the plates comprise straight lengths.

21. A method for capturing wind, power using, a wind turbine apparatus, comprising:
   receiving a flow of wind by the wind turbine apparatus,
      wherein the wind turbine apparatus comprises a turbine blade assembly comprising a plurality of elongated turbine blades rotatably mounted about an axis, each turbine blade having a lift-producing aerofoil-shaped profile with a leading edge, a trailing edge, an outer low-pressure curved surface and an inner relatively high-pressure surface; and
      wherein the wind turbine apparatus further comprises a pair of wind deflection members, wherein each wind deflection member comprises a plate including an apex edge, and wherein the apex edges are positioned at opposite ends of a diameter of the wind turbine apparatus such that the wind direction is perpendicular to said diameter in a first perpendicular direction defined by the position of the apex edges, wherein no wind-guiding members compress the flow of wind into the turbine blades when the wind is in the first perpendicular direction, and wherein the turbine blades and the deflection members are unobstructedly exposed to the flow of wind, and wherein the plates terminate in the wind direction before the termination of the turbine blade assembly in the wind direction; and
   wherein receiving the flow of wind comprises rotating the wind turbine blade assembly.

* * * * *